(12) United States Patent
Komooka et al.

(10) Patent No.: US 7,834,879 B2
(45) Date of Patent: *Nov. 16, 2010

(54) DRAWING APPARATUS FOR DISPLAYING IMAGE DATA ABOUT A PLURALITY OF OBJECTS INCLUDING SEMITRANSPARENT OBJECT AND OPAQUE OBJECT ON COMPUTER DISPLAY SCREEN

(75) Inventors: Haruo Komooka, Kanagawa-ken (JP); Kazuhiko Hasegawa, Nagoya (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/112,680

(22) Filed: Apr. 30, 2008

(65) Prior Publication Data

US 2008/0211811 A1 Sep. 4, 2008

Related U.S. Application Data

(63) Continuation of application No. 09/433,475, filed on Nov. 4, 1999, now Pat. No. 7,453,458.

(30) Foreign Application Priority Data

Dec. 15, 1998 (JP) .................................. 10-355757

(51) Int. Cl.
*G06T 15/00* (2006.01)

(52) U.S. Cl. ..................... 345/501; 345/419; 345/421; 345/422; 345/592

(58) Field of Classification Search ................. 345/419, 345/421, 422, 501, 509, 592
See application file for complete search history.

(56) References Cited

U.S. PATENT DOCUMENTS

| | | | |
|---|---|---|---|
| 5,220,646 A | | 6/1993 | Fossum |
| 5,923,333 A | | 7/1999 | Stroyan |
| 6,717,576 B1 | * | 4/2004 | Duluk et al. ............... 345/419 |
| 7,116,337 B2 | * | 10/2006 | Andrews .................... 345/592 |
| 7,167,181 B2 | * | 1/2007 | Duluk et al. ............... 345/506 |
| 7,170,515 B1 | * | 1/2007 | Zhu ........................... 345/422 |

FOREIGN PATENT DOCUMENTS

| | | |
|---|---|---|
| EP | 455374 | 11/1991 |
| EP | 553973 | 8/1993 |
| JP | 09330422 | 12/1997 |
| JP | 10011610 | 1/1998 |
| JP | 10208076 | 8/1998 |
| WO | WO9002990 | 3/1990 |

\* cited by examiner

*Primary Examiner*—Phu Nguyen
(74) *Attorney, Agent, or Firm*—Ohlandt, Greeley, Ruggiero & Perle, LLP; Daniel P. Morris (57) ABSTRACT

A drawing apparatus which can display image data about a plurality of objects including opaque objects and semitransparent objects, each having information about a depth direction, on a computer display screen.

5 Claims, 6 Drawing Sheets

FIG.7

DRAWING APPARATUS FOR DISPLAYING IMAGE DATA ABOUT A PLURALITY OF OBJECTS INCLUDING SEMITRANSPARENT OBJECT AND OPAQUE OBJECT ON COMPUTER DISPLAY SCREEN

CROSS-REFERENCED APPLICATIONS

This is a continuation application of U.S. patent application Ser. No. 09/433,475, filed on Nov. 4, 1999, now U.S. Pat. No. 7,453,458 which is incorporated herein in its entirety.

FIELD OF THE INVENTION

This invention generally relates to computer graphics and more particularly to a drawing order for displaying a semitransparent object.

BACKGROUND OF THE INVENTION

In the field of Computer Aided Design (CAD), a three-dimensional object is modeled and represented by a surface and a solid. Forming a realistic object on a screen from image data derived from the model is generally called rendering. The three-dimensional display of objects utilizing computer graphics includes modeling and rendering as main processes.

Generally, this rendering process includes shading to take into account subtle changes in shade and color, the tinge of an object, reflections, brightness, any refractions, shadows projected by light sources, any wraparound of light from the periphery, a picture, any transparency or any opacity of an object, or the like, in order to more realistically reproduce the color of the object, similar to a photograph.

In the rendering process, the model of each three-dimensional object is projected from a three-dimensional object space onto a plane of projection for a two-dimensional image space. That plane of projection for a two-dimensional image space is the computer display screen. The model is projected and displayed on a two-dimensional region, that is the computer display screen by a perspective projection from a view point, a central projection from a center of projection, or by a parallel projection from a parallel line of sight from an infinite point. The projections are made in accordance with information on depth direction, also called the "Z-direction," in such a manner that the screen is painted over with the model.

The model is projected and displayed on the screen so that the screen is painted over with the model, by either of the following methods. (1): only writing (W) the image data of the object displayed in a storage area prepared as a display buffer; or (2): a repeating RMW (read, modify and write) cycle, i.e., first reading (R) the image data stored in the storage area prepared as the buffer or the like; then modifying (M) the read image data; and then writing (W) the modified image data. This repeating RMW cycle is a typical cycle form for "drawing".

For such a projection, a hidden surface removal algorithm called a Z-buffer algorithm is well known and widely utilized to remove hidden lines and surfaces. Each individual pixel on a computer screen represents a minimum unit of a display plane, each capable of having a color and brightness allocation. In the Z-buffer algorithm, as its name signifies, each pixel preferably has a memory (depth memory) for storing a Z-value, i.e. a distance from the view point, a distance from the center of projection or the like, or the depth information, of the object. The set of pixel memory is preferably organized as a memory array, having a size corresponding to the number of pixels and referred to as a Z-buffer.

The display is produced by painting over the screen in an opaque color by itself while utilizing the Z-buffer algorithm to remove hidden lines and surfaces. However, it is difficult for a user to check an inner portion of a design which is obscured by an opaque object. The Z-buffer algorithm is utilized to display only the opaque object. However, CAD applications also requires a display method where not only the surface but also an inner portion can be simultaneously viewed by semitransparently displaying the object.

One approach for semitransparently displaying the object is to separately draw the surface and the inner portion using a blending approach. In this approach, coefficients A and B are used for the color (src_color) of the object to be drawn and the color (dest_color) of the object that is already drawn, respectively. A new color (color) is determined by color=A×src_color+B×dest_color. In this case, the color (dest_color) of the object that is already drawn is read (R). Then, the color is modified (M) by the color (src_color) of the object that is already drawn. Then, the new color (color) is written (W). In other words, the read color (dest_color) of the object that is already drawn is replaced by the new color (color), so that the new color (color) is displayed. In this case, the modification of the new color (color) is calculated by multiplying the coefficient A and the coefficient B.

Particularly, equation (1) is generally used as a method, sometimes called an alpha blend method, which uses a semitransparent coefficient, alpha (sometimes called an alpha blending rate).

$$\text{color} = \text{alpha} \times src\_color + (1-\text{alpha}) \times dest\_color \quad (1)$$

Calculating and drawing the new color by using equation (1) is referred to as "blending" as explained in greater detail below. Blending has the following characteristic: On the same point, the object that is later drawn is seen nearer to the view point than the object that is already drawn.

Consequently, an attempt at an accurate semitransparent display of a plurality of objects should cause those objects to be drawn according to some priority. That is, the objects should be sorted in accordance with their distance from the view point of the user (i.e., in accordance with the depth along the depth direction), whereby the priority of an object to be drawn is determined in accordance with the distance from the view point of the user. The objects then are drawn in accordance with their priority.

If the objects are drawn without determining their priority, the relative near and far positions of the objects may appear to be displayed differently from the actual positions. As mentioned above, this is a result of the phenomenon that the object that is later drawn is seen nearer regardless of the relative positions of the objects. This problem also arises when the object near to the view point is drawn earlier and the object far from the view point is later blended with the earlier drawn object.

Thus, seeking a high quality for ensuring a strict perspective drawing for the user needs the strict sorting for the semitransparent display. However, the larger the number of objects to be sorted is, the more the time required for the sorting is acceleratingly needed. In this situation, a processing speed required for the whole graphic is considerably reduced. This is a serious problem. As can be seen from a rough estimate, the number of processing, n×log(n) is generally needed in order to sort a permutation $_nP_n$ (n denotes the number of objects to be sorted).

The use of this sorting procedure is disadvantageous to an application such as CAD requiring an interactive (interactive or real-time) data editing. More particularly, the sorting of every pixel is required to edit a plurality of free curved surfaces, when one pixel represents one of facets which the curved surface is divided into. Assuming the general screen having 1280×1024 pixels, the decreased processing speed no longer has practical use.

It may be that alpha blending of the objects without completely sorting objects by their distance from the view point may present no significant visual problem for the user. On the other hand, the ability to omit the sorting and thus realize the high-speed processing would be very preferable, because the processing speed is important for the application for the interactive data editing.

It is desirable then to provide a method of semitransparent display which is executable without sorting by multi-pass alpha blending.

SUMMARY OF THE INVENTION

In accordance with the present invention, a method is provided for multi-pass semitransparent processing having three passes. The method provides for displaying image data about a plurality of objects including opaque objects and semitransparent objects on a computer display screen by using an updatable Z-buffer as a storage, utilizing information about a depth direction for each object. The method comprises the steps of: drawing the opaque object by itself from the image data, while updating the Z-buffer and executing a hidden surface removal by a Z-buffer algorithm; drawing the semitransparent object by itself from the image data without updating the Z-buffer and while executing the hidden surface removal by the Z-buffer algorithm; and, drawing the semitransparent object by itself from the image data, while updating the Z-buffer and executing the hidden surface removal by the Z-buffer algorithm.

Further in accordance with the invention, a hardware resource capable of implementing the multi-pass method of the present invention is provided. The hardware resource is preferably implemented as a drawing apparatus which can display image data about a plurality of objects including opaque objects and semitransparent objects on a computer display screen, utilizing information about a depth direction for each object. The apparatus comprises: an updatable Z-buffer corresponding to each dot on the computer display screen, for storing the depth information; and, an updatable frame buffer corresponding to each dot on the computer display screen, the frame buffer being capable of outputting the contents therein to the display screen, for storing the data to be displayed. The apparatus further comprises a rendering engine, the engine receiving the image data and then comparing the depth information about the image data to be drawn to the depth information that is already stored in the Z-buffer, thereby permitting judging whether or not the depth information on the image data to be now drawn is larger than the depth information that is already stored in the Z-buffer. The engine further being capable of selecting either outputting the data to be displayed while updating the depth information or outputting the data to be displayed without updating the depth information, and the engine further being capable of reading the data to be displayed that is already stored in the frame buffer and then blending the read data with the image data received thereafter for each dot on the computer display screen.

Additionally an attention is directed to conditions which are considered to be important for displaying a semitransparent object at a position near to the actual relative position regardless of a drawing order. First, in pass 1, an opaque object alone is drawn while a hidden surface removal is executed by Z-buffer algorithm. The Z-buffer is updated. Then, in pass 2, a semitransparent object alone is blended while the hidden surface removal is executed by the Z-buffer algorithm. In this pass, the Z-buffer is not updated. Finally, in pass 3, the semitransparent object alone is blended while the hidden surface removal is executed by the Z-buffer algorithm. In this pass, the Z-buffer is updated. The opaque display or conventional simple semitransparent display is executed by one-pass, whereas the present method needs three passes. Without any need for an additional hardware, the drawing time can be, however, within a range of practical use, i.e., it is about twice the time required for the opaque drawing and conventional method. When the drawing using actual data is evaluated by users, the users are fully satisfied with both of the display with the visual relative position kept and the drawing speed capable of the interactive processing.

DETAILED DESCRIPTION OF THE INVENTION

Figure 1:
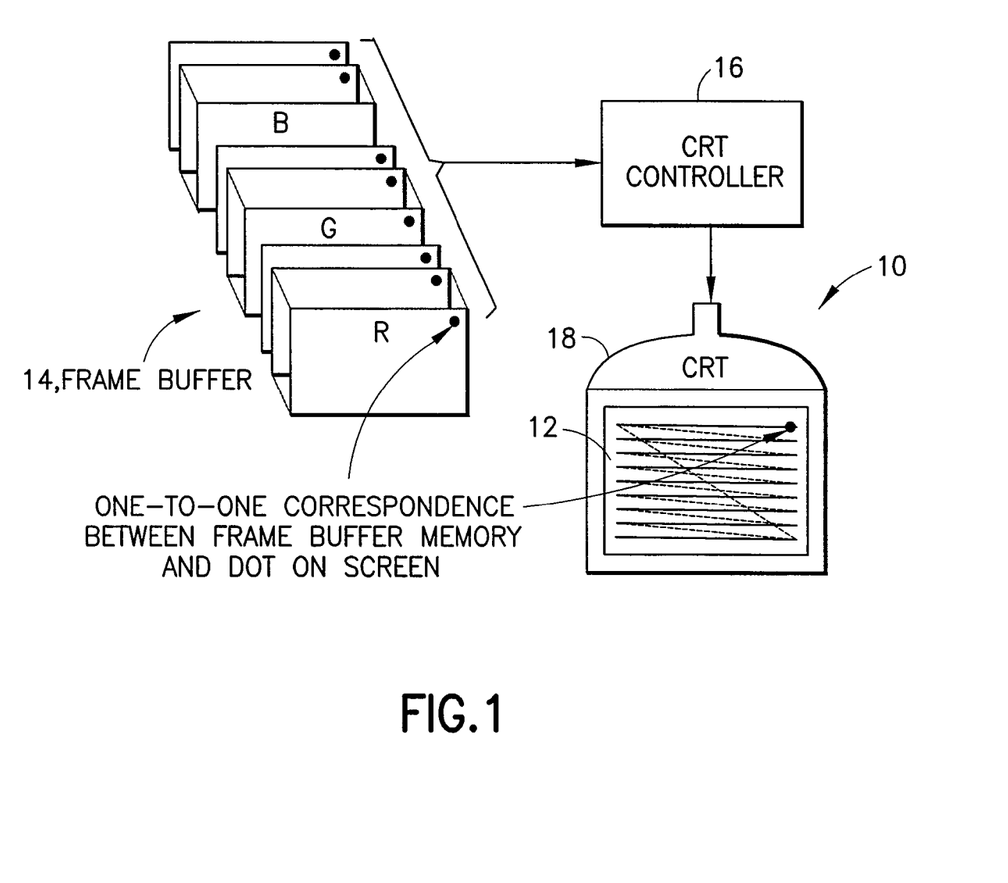
FIG. 1 shows a hardware configuration for processing computer graphics in accordance with the invention, including a raster monitor CRT.

FIG. 1 shows a hardware configuration for processing computer graphics. A raster monitor CRT 10 having a cathode-ray tube (CRT) for refreshing data will be herein described as the hardware which has been most popular in recent years. However, it is very easy for one skilled in the art to consider the configuration having any other display such as a liquid crystal display (LCD) instead of the CRT.

Geometric information to be displayed on a screen 12 is digitized. The digitized data is temporarily stored, dot by dot, in a frame buffer memory 14. The dot-by-dot information in the frame buffer is composed of red, green and blue brightness information (if 8(n) bits were given, number of status $2^8(2^{(m)})$ can be represented.) or the information equivalent to the brightness information. One pixel corresponds to one dot in order to have a one-to-one correspondence between the pixel and the frame buffer memory 14.

The digitized data in the frame buffer memory is transferred to a CRT controller 16. The data is converted into a video signal. An electron beam is oscillated and moved on a scanning line in CRT 18, whereby the desired graphic information is displayed on the screen 12.

Figure 2:
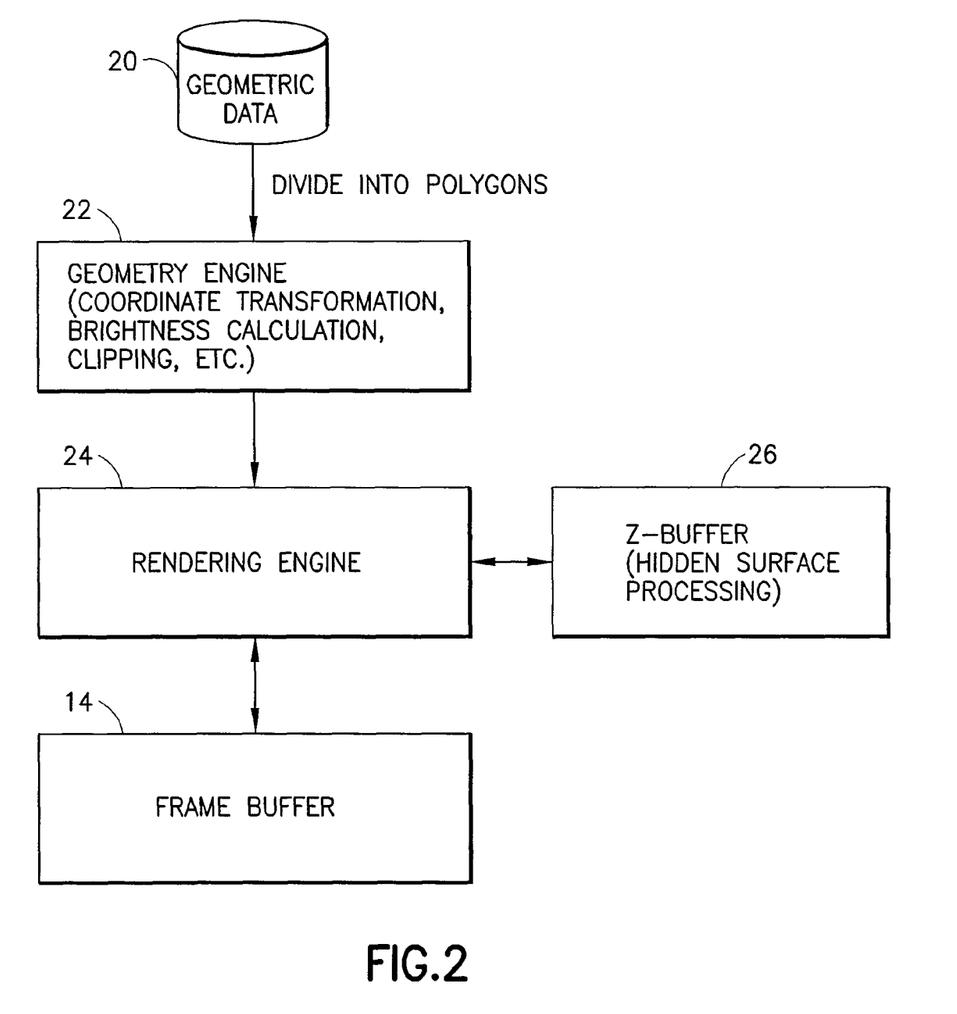
FIG. 2 is a flow chart showing a general graphics processing method for obtaining graphics information and transferring it to a frame buffer.

FIG. 2 is a flow chart showing a general graphics processing for obtaining the graphic information to be transferred to the frame buffer. Geometric data 20 about an object or an object to be drawn is divided into polygons and then transferred to a geometry engine 22. The geometry engine 22 calculates the brightness of a vertex from a coordinate transformation of the vertex of the polygon, a clipping, a light source, the information about a material of the object, or the like. A rendering engine 24 calculates a color of each pixel by interpolation in accordance with the vertex data and the brightness information. The data undergoes a hidden surface processing by Z-buffer 26. The data is then written to the frame buffer.

The Z-buffer, hidden surface processing, hidden line processing, shading or the like can be also executed by a high-speed graphics accelerator having a graphics processor for use in graphics only, independent of a CPU.

Figure 3:
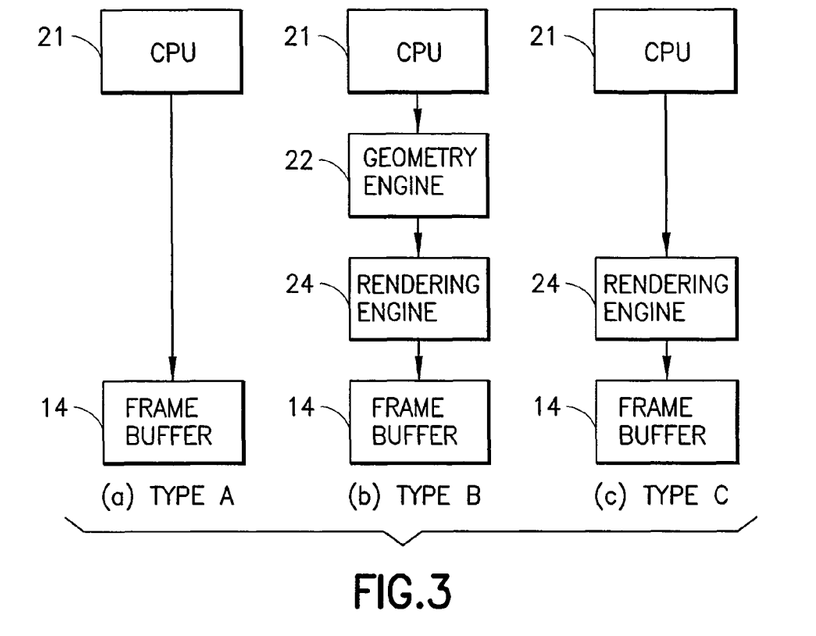
FIG. 3 shows three types of computer architecture for implementing graphics processing.
Figure 4:
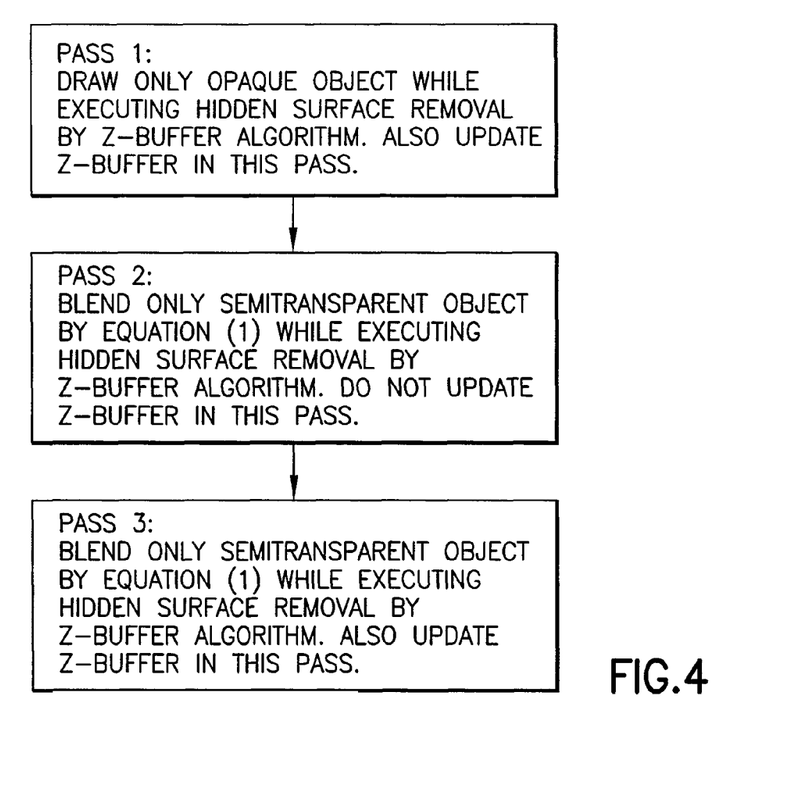
FIG. 4 is a flow chart showing a multi-pass semitransparent processing method in accordance with the invention.

FIG. 3 shows types of a computer architecture for implementing the graphics processing. Type A causes CPU 21 of WS to execute all the processing and has the frame buffer 14 alone for the display. Type B has a pipeline structure including the geometry engine 22 and the rendering engine 24 which take the form of the hardware. Type C has the rendering engine 24 alone taking the form of the hardware and causes a software in CPU 21 to execute the processing to be executed by the geometry engine 22.

The type B or C is used for a complicated processing handling a great deal of data. A drawing method of the present invention can be implemented by using a display processor of any one of types A, B and C, as far as the architecture is provided with the Z-buffer (or any pseudo component that can be controlled by the software) capable of independently controlling a comparison and an updating for a hidden surface removal; and the frame buffer having alpha blending function. More particularly, this method is useful for the types B and C having the hidden surface removal by the hardware and the alpha blending function.

Although the Z-buffer algorithm is one type of a method in list priority, its advantage is characterized by that new objects can be additionally drawn one after another even after the drawing of all the objects is once finished. Z-buffer algorithm does not hold the information about the object that is drawn before or behind the object that is now being drawn, because the object is drawn one by one at a time (regardless of the other objects). A very small area is therefore enough for the memory storage area which must be secured in the computer.

However, the Z-buffer algorithm is also characterized by that the object once drawn cannot be removed. The reason is as follows. In the Z-buffer algorithm, whether or not the other objects are in a model space has no effect on the procedure of the hidden surface removal. In other words, the object "which must be hidden and thus unseen" may be drawn at a certain point in the processing. This is caused by the following fact. That is, the processing requires the data about the object to be newly drawn and the Z-buffer alone.

The Z-buffer algorithm is processed in the following manner. The updated value is used for the subsequent drawing, while the Z-buffer is sequentially updated. If the Z-buffer is not updated (i.e., if the updating is stopped), the intact value can be maintained and used.

In the present invention, the characteristic of the Z-buffer algorithm that the new object can be additionally drawn later is therefore used in successful combination with the approach for the semitransparent display using the alpha blending, in consideration of the timing of the updating of the Z-buffer. A success can be thereby obtained in the omission of the sorting procedure which is strict but takes time by using the combination.

That is, an idea, that the objects are sorted in accordance with the distance and then a semitransparent object is exactly displayed, is abandoned. However, an attention is directed to the following conditions 1 to 3. These conditions are considered to be important for displaying the semitransparent object at the position near to the actual relative position regardless of the drawing order. These conditions are carefully set not to cause a visual problem for a user.

Condition 1: The object nearest to the view point should be last blended or drawn regardless of whether the object is semitransparent or opaque. This is attributed to the following characteristic. The object that is last alpha-blended or drawn is seen nearer to the view point than the object that is previously alpha-blended or drawn, regardless of whether the object is semitransparent or opaque.

Condition 2: The object that is farther from the view point than the opaque object is not displayed, regardless of whether it is semitransparent or opaque. This is faithfully based on the following characteristic. The opaque object obscures the object located behind the opaque object.

Condition 3: The object that is farther from the view point than the semitransparent object is alpha-blended and displayed regardless of whether it is semitransparent or opaque, except for the case where the object is not displayed under the condition 2.

These conditions 1 to 3 are satisfied by a multi-pass processing (also called "a multi-pass semitransparent processing" because it is characterized by the processing of the semitransparent object) which is divided into three steps as described below, instead of the sorting procedure that has been needed.

Pass 1: Only the opaque object is drawn while the hidden surface removal is executed by the Z-buffer algorithm. In this case, the Z-buffer is also updated.

Pass 2: Only the semitransparent object is blended by equation (1) while the hidden surface removal is executed by the Z-buffer algorithm. In this case, the Z-buffer is not updated.

Pass 3: Only the semitransparent object is blended by equation (1) while the hidden surface removal is executed by the Z-buffer algorithm. In this case, the Z-buffer is also updated.

In "one-pass" of the prior art, the data has been drawn in the given order without the hidden surface removal by the Z-buffer algorithm and without the data sorting. In multi-pass, the data is drawn through three passes.

A function of each of the passes 1 to 3 will be described in further detail.

In the pass 1, only the opaque object is processed. At this time, the hidden surface removal is executed by the Z-buffer algorithm and the Z-buffer is updated in the same manner as the normal processing of the opaque object. The alpha blending by equation (1) is not executed. As a result, the opaque object nearest to the view point is displayed. The value of the Z-buffer is changed to the corresponding value. As for the opaque object, the condition 2 is satisfied, because the opaque object is not drawn in the passes 2 and 3.

In the pass 2, only the semitransparent object is processed. The alpha blending by equation (1) is executed while the hidden surface removal is executed by the Z-buffer algorithm. The Z-buffer is not updated. Only the object, which is nearer to the view point than the opaque object drawn in the pass 1, is consequently alpha-blended by means of the hidden surface removal by the Z-buffer algorithm. Also as for the semitransparent object, the condition 2 is satisfied, because the Z-buffer is updated to the depth value of the semitransparent object in the pass 1 and thus the semitransparent object farther from the view point than the opaque object is not drawn. The semitransparent object, which is nearer to the view point than the opaque object drawn in the pass 1, is always blended, because the Z-buffer is not updated in this pass 2. As a consequence, the condition 3 is satisfied.

At the end of the pass 2, the value of each point in the Z-buffer is kept at the same value as the value which is obtained at the end of the pass 1. That is, also at this time, the Z-buffer holds the distance to the opaque object nearest to the view point on each point.

In the pass 3, only the semitransparent object is again processed. The alpha blending by equation (1) is executed while the hidden surface removal is executed by the Z-buffer algorithm. The Z-buffer is also updated. A difference between the passes 2 and 3 is therefore that the Z-buffer is updated. In the pass 2, both the two semitransparent objects are alpha-blended regardless of the relative positions of these objects, because the Z-buffer is not updated.

On the other hand, in the pass 3, the nearer object is earlier processed and consequently the object later processed is not alpha-blended, because the Z-buffer is updated. During the processing in the pass 3, the Z-buffer holds the distance from the view point to the object that is last alpha-blended or drawn on each point. The object to be last alpha-blended is therefore the object nearest to the view point. The condition 1 is thus satisfied. When the semitransparent object does not exist between the opaque object and the view point, the object drawn by the pass 1 is last drawn. Also in this case, the condition 1 is satisfied.

It should be noted that although the relative positions of the (opaque or semitransparent) object nearest to the view point and the other (opaque or semitransparent) objects are seen without any trouble, it is not always certain that the relative position of the semitransparent object situated between these objects is seen. This is attributed to the omission of the exact sorting procedure.

The relative positions of objects other than the nearest object depend on the order of the drawing by an application. For example, a typical interactive processing, CAD often includes rotating the object so as to see it from the opposite direction. It is impossible to define data in order of the distance from the eye position of the user unless the objects are sorted. The positions of these objects are, however, less important than the position of the (opaque or semitransparent) object nearest to the view point, and thus they can admit of a large compromise.

How "drawing" can be executed will be described in connection with RMW cycle. The drawing in the pass 1 does not need to execute all of R, M and W. The execution of W alone is sufficient for the replacement by the image data about the opaque object. However, the drawing in the passes 2 and 3 needs to blend the current background color (the color (dest_color) of the object that is already drawn) with the color of the semitransparent object to be now drawn (the color (src_color) of the object to be drawn). Thus, it is necessary to execute all of R, M and W.

As a more particular example, three objects to be drawn, i.e., an opaque object A, a semitransparent object B and a semitransparent object C are assumed. The display result will be discussed which is given by the passes 1 to 3, the approach of the present invention, when the objects are always drawn in the order of A, B and C by an application program for graphics drawing.

Herein, A<B represents that A is nearer to the view point than B by the use of a sign <. A portion, in which three objects A, B and C overlap when seen from the view point, will be discussed below.

C<B<A (C is nearest to the view point and A is farthest from the view point):
 In the pass 1, A is drawn.
 In the pass 2, B is blended and then C is blended.
 In the pass 3, B is blended and then C is blended.
 As a result, C is seen nearest and B and A are seen behind C.

Figure 5:
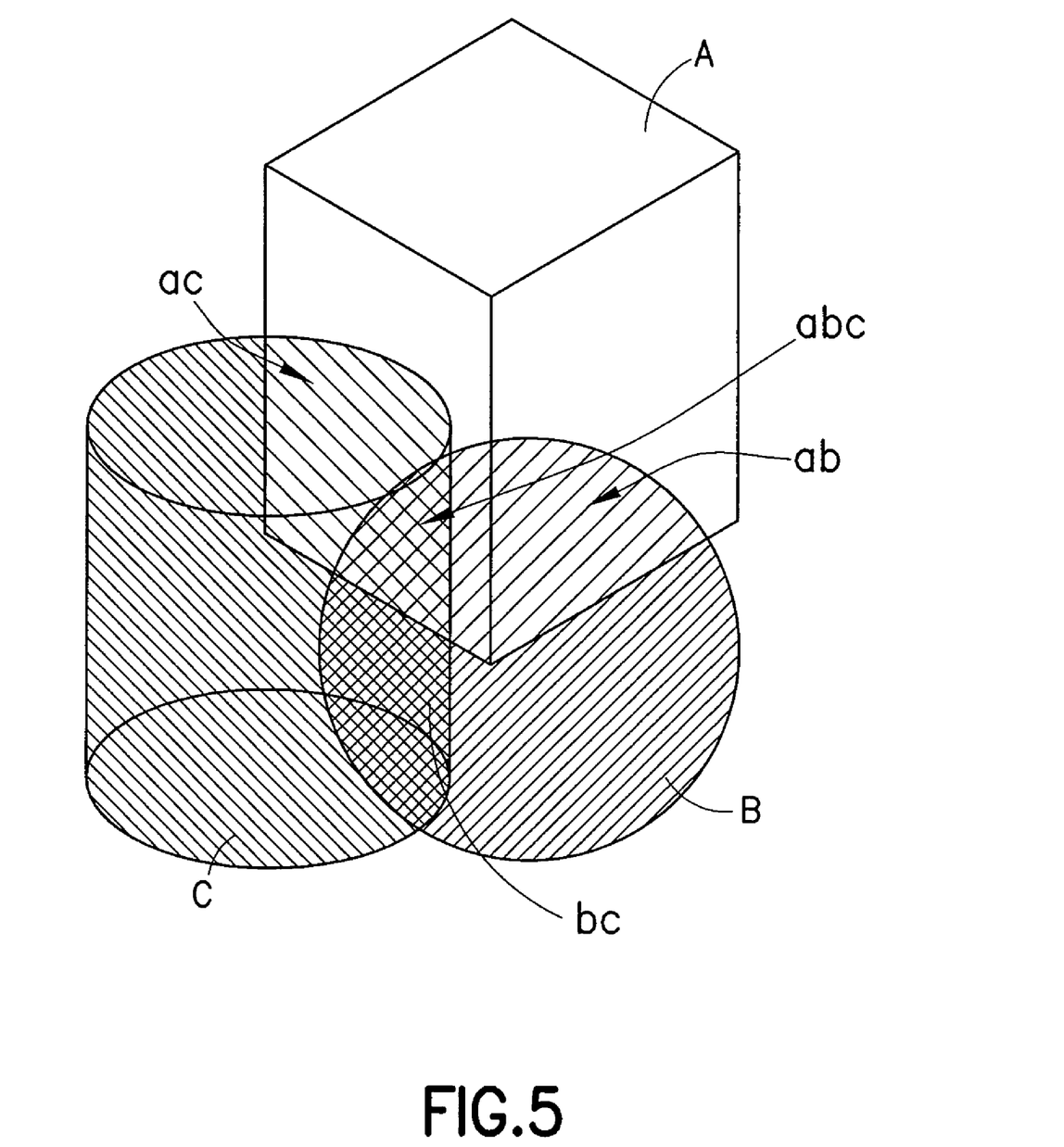
FIG. 5 illustrates in detail the display result which is obtained when objects are drawn in the order of A, B and C by using a multi-pass semitransparent processing method in accordance with the invention.

FIG. 5 illustrates the drawing result which is obtained in the case of C<B<A (C is nearest to the view point and A is farthest from the view point), in more detail (than the drawing result of FIG. 6 described below). In this drawing, the portion associated with the object B is represented by slanted lines (extending from the upper right to the lower left), all of which are directed in the same direction. The portion associated with the object C is represented by the slanted lines (extending from the upper left to the lower right), all of which are directed in the same direction that is different from the direction of the lines representing the object B. A region to be drawn as mentioned below is specified by not only one type of slanted lines but also a combination of two types of slanted lines crossing. More particularly, a mesh-like region to be drawn also exists in which the slanted lines extending from the upper right to the lower left and the slanted lines extending from the upper left to the lower right cross.

A region ab to be drawn is the portion in which A and B overlap. This region is drawn in such a manner that A is seen behind B. A region bc to be drawn is the portion in which B and C overlap. This region is drawn in such a manner that B is seen behind C. A region ac to be drawn is the portion in which A and C overlap. This region is drawn in such a manner that A is seen behind C. Furthermore, a region abc to be drawn is the portion in which all of A, B and C overlap. This region is drawn in such a manner that B is seen before A and C is seen before B. The difference between the region bc to be drawn and the region abc to be drawn is represented by a mesh density which varies depending on whether or not the object A and the objects B and C overlap.

Figure 6:
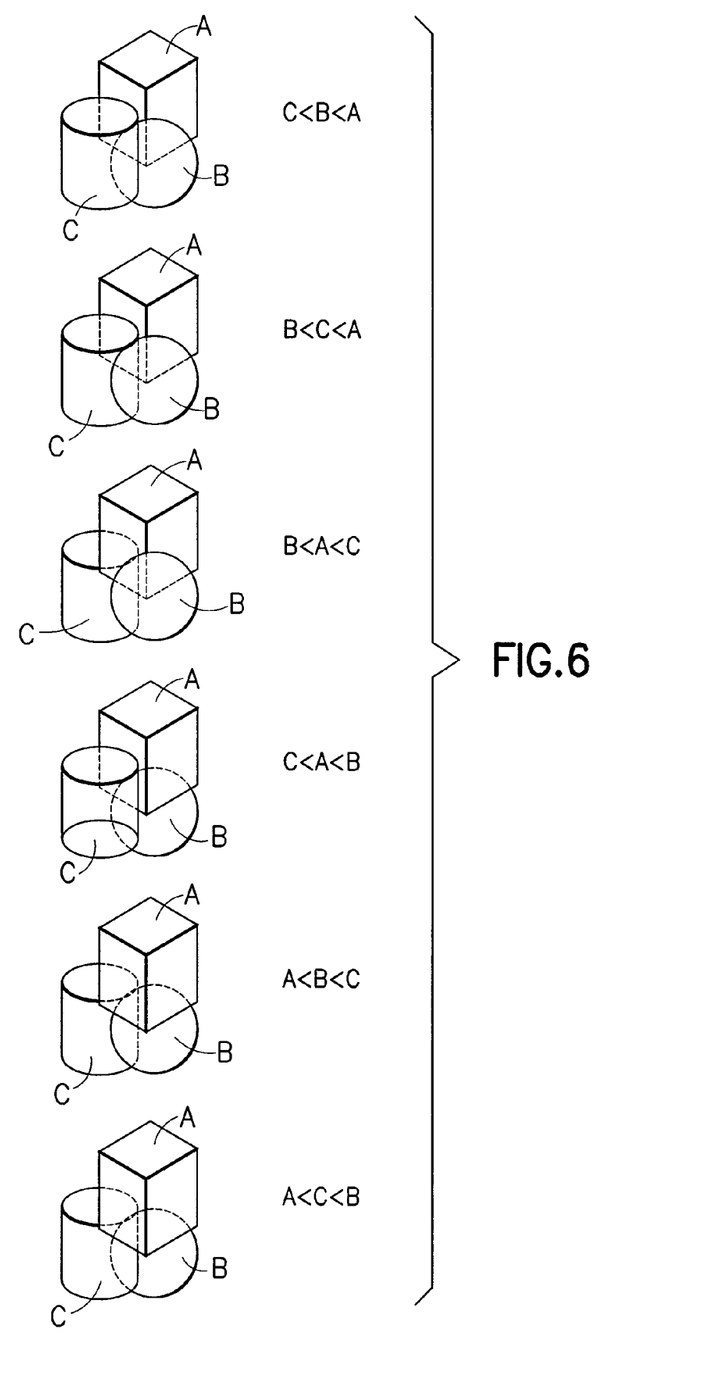
FIG. 6 illustrates the display result which is obtained when the objects to be drawn are drawn in the order of A, B and C by using a multi-pass semitransparent processing method in accordance with the invention, for all the possible relative positions of three objects to be drawn, i.e., the opaque object A, the semitransparent object B and the semitransparent object C.

FIG. 6 shows all the possible relative positions of the three objects A, B and C including C<B<A. As for cases other than C<B<A, the detailed representation and description of the drawing result shown in FIG. 5 are omitted.

B<C<A (B is nearest to the view point and A is farthest from the view point):
 In the pass 1, A is drawn.
 In the pass 2, B is blended and then C is blended.
 In the pass 3, B is blended but C is not blended.
 As a result, B is seen nearest and C and A are seen behind B.

B<A<C (B is nearest to the view point and C is farthest from the view point):
 In the pass 1, A is drawn.
 In the pass 2, B alone is blended, and C is hidden behind A and thus C is not blended.
 In the pass 3, B alone is blended, and C is hidden behind A and thus C is not blended.
 As a result, A is seen behind B.

C<A<B (C is nearest to the view point and B is farthest from the view point):
 In the pass 1, A is drawn.
 In the pass 2, only C is blended, and B is not blended because B is hidden by A.
 In the pass 3, only C is blended, and B is not blended because B is hidden by A.
 As a result, A is seen behind C.

A<B<C (A is nearest to the view point and C is farthest from the view point):
 In the pass 1, A is drawn.
 In the pass 2, nothing is drawn.
 In the pass 3, nothing is drawn.
 As a result, A alone is displayed.

A<C<B (A is nearest to the view point and B is farthest from the view point):
 In the pass 1, A is drawn.
 In the pass 2, nothing is drawn.

In the pass 3, nothing is drawn.

As a result, A alone is displayed.

In the above examples, A is first drawn. However, the opaque object is always processed earlier than the semitransparent object regardless of the order of the drawing by the application program, because the opaque object is processed in the pass 1 and the semitransparent object is processed in the passes 2 and 3. The same result is therefore obtained in the case where the opaque object is second or third drawn.

As described above, the approach of the present invention is not used for the exact semitransparent display. However, the following fact was confirmed. When the alpha blending is used in the multi-pass according to the present invention, the objects are displayed in such a manner that the near and far relative position is kept, compared to the case where the alpha blending is used in only the one-pass.

In Table 1, there is shown the result of measurement of a performance on the actual application. The measurement result of the semitransparent drawing with the sorting is not obtained, because it has no practical use and it is difficult to implement. Therefore, the result of a simulation is measured as the time required for a logic processing for the sorting. This result is added to the semitransparent processing time in the one-pass, whereby the estimated time is determined and used as the time to be compared. This is judged to be unusable for the interactive processing.

TABLE 1

Time required for drawing repeated 100 times by different drawing approaches

| | Drawing approach | Benchmark 1 | Benchmark 2 |
|---|---|---|---|
| [1] | Opaque | 8.3 sec | 64.6 sec |
| [2] | One-pass semitransparent | 8.3 sec | 63.9 sec |
| [3] | Estimated sorting time | 272.8 sec | 767.0 sec |
| [4] | Semitransparent after sorting | 281.1 sec | 830.9 sec |
| [5] | Multi-pass semitransparent | 15.0 sec | 129.2 sec |

In more particular, [1] and [2] are drawn by the use of current graPHIGS. graPHIGS (graPHIGS is a trademark of IBM Corp. in U.S. and other countries) is three-dimensional (3D) graphics API (Application Programming Interface). IBM Corp. implements ISO Standard PHIGS (Programmer's Hierarchical Interactive Graphics System) as graPHIGS. [2] is the semitransparent processing by the one-pass blending without the sorting. In this case, the relative position is not retained. In [3], the time required for the sorting is measured and estimated by a simulation program. [4] is determined by assuming that [4]=[2]+[3]. [5] is that the current graPHIGS is remodeled and implemented so that the multi-pass semitransparent processing of the present invention can be executed whereby the object is drawn.

[1] and [2] can be processed by a single (one) pass. On the other hand, [5] which the present invention is applied to needs three passes 1 to 3. The drawing time can be, however, within a range of practical use, i.e., it is about twice the time required for the opaque drawing and conventional method. The users evaluated the result of the drawing using actual data. As a result, the users are fully satisfied with both of the display with the visual relative position kept and the drawing speed capable of the interactive processing.

Figure 7:
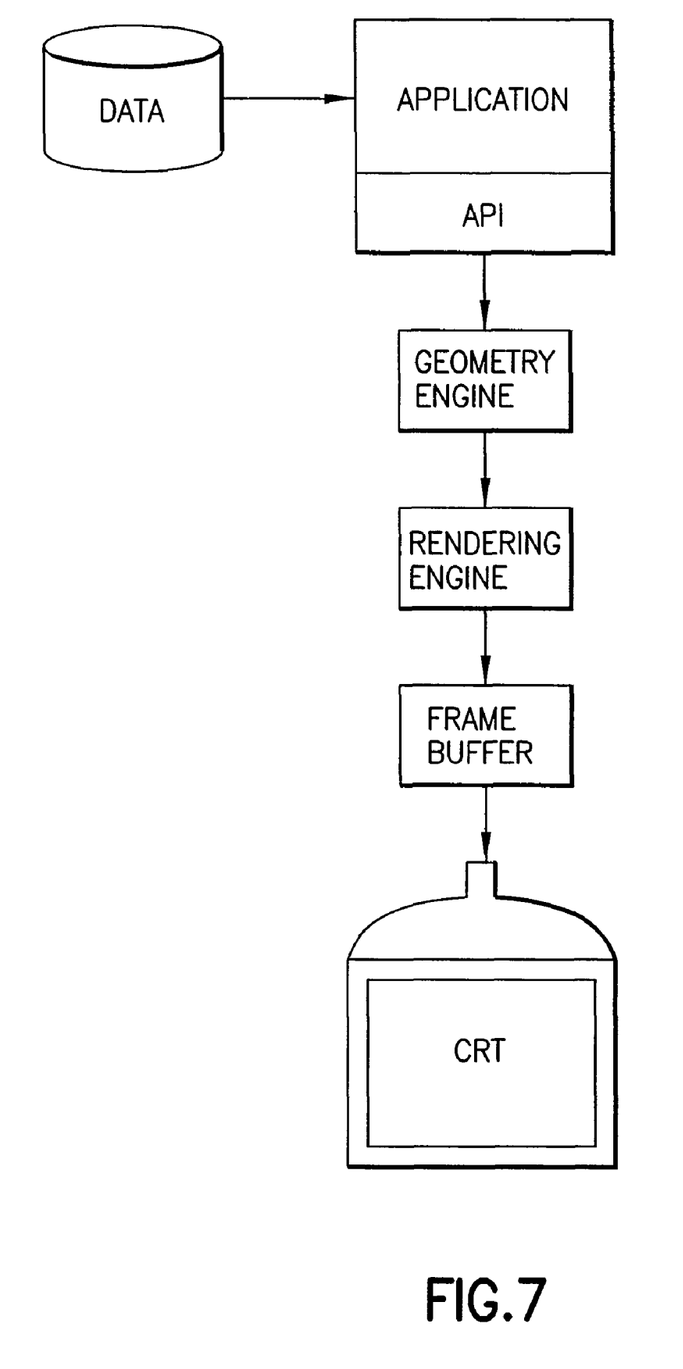
FIG. 7 illustrates method of the present invention implemented as a graphics application programming interface (API) and also at an application level.

As can be seen from a relationship as shown in FIG. 7, the method of the present invention can be implemented for not only graphics API but also an application level. That is, although the graphics processing is executed through API, the present method can be also implemented for the application level as the step following API. One skilled in the art could apply the present invention to the application level in various ways.

What is claimed is:

1. A drawing apparatus which can display image data about a plurality of objects including opaque objects and semitransparent objects, each having information about a depth direction, on a computer display screen, said apparatus comprising:

an updatable Z-buffer corresponding to each dot on the computer display screen, for storing the depth information;

an updatable frame buffer corresponding to each dot on the computer display screen, said frame buffer being capable of outputting the contents therein to the display screen, for storing the data to be displayed; and a rendering engine, said engine receiving the image data and then comparing the depth information on the image data to be now drawn to the depth information that is already stored in said Z-buffer, thereby permitting judging whether or not the depth information on the image data to be now drawn is larger than the depth information that is already stored in said Z-buffer, said engine being capable of selecting either outputting the data to be displayed while updating the depth information or outputting the data to be displayed without updating the depth information, said engine being capable of reading the data to be displayed that is already stored in said frame buffer and then blending the read data with the image data received thereafter for each dot on the computer display screen, displaying the data to be displayed that is outputted from said frame buffer on said computer display screen, and said rendering engine, without sorting objects to be drawn in accordance with depth along said depth direction, performs said receiving, comparing, judging, selecting, updating, outputting, reading, blending and displaying.

2. The apparatus according to claim 1, wherein the blending for said semitransparent object is executed by alpha blending.

3. The apparatus according to claim 1, wherein said rendering engine initially processes at least one of said opaque objects and stores depth information thereof in said z-buffer, and wherein said depth information of said at least one opaque object is available for comparison with depth information about said semitransparent objects during said judging and said blending.

4. The apparatus according to claim 1, wherein said rendering engine is operable to perform the operations of (a) drawing said opaque object alone of the image data, while updating said Z-buffer and executing a hidden surface removal by a Z-buffer algorithm; (b) drawing said semitransparent objects alone of the image data without updating said Z-buffer and while executing the hidden surface removal by said Z-buffer algorithm; and (c) drawing said semitransparent objects alone of the image data, while updating said Z-buffer and executing the hidden surface removal by said Z-buffer algorithm.

5. A raster scan display having the drawing apparatus according to claim 1.

* * * * *